No. 741,314. PATENTED OCT. 13, 1903.
L. DECAY.
SUGAR CANE HARVESTER.
APPLICATION FILED JUNE 27, 1902.
NO MODEL.
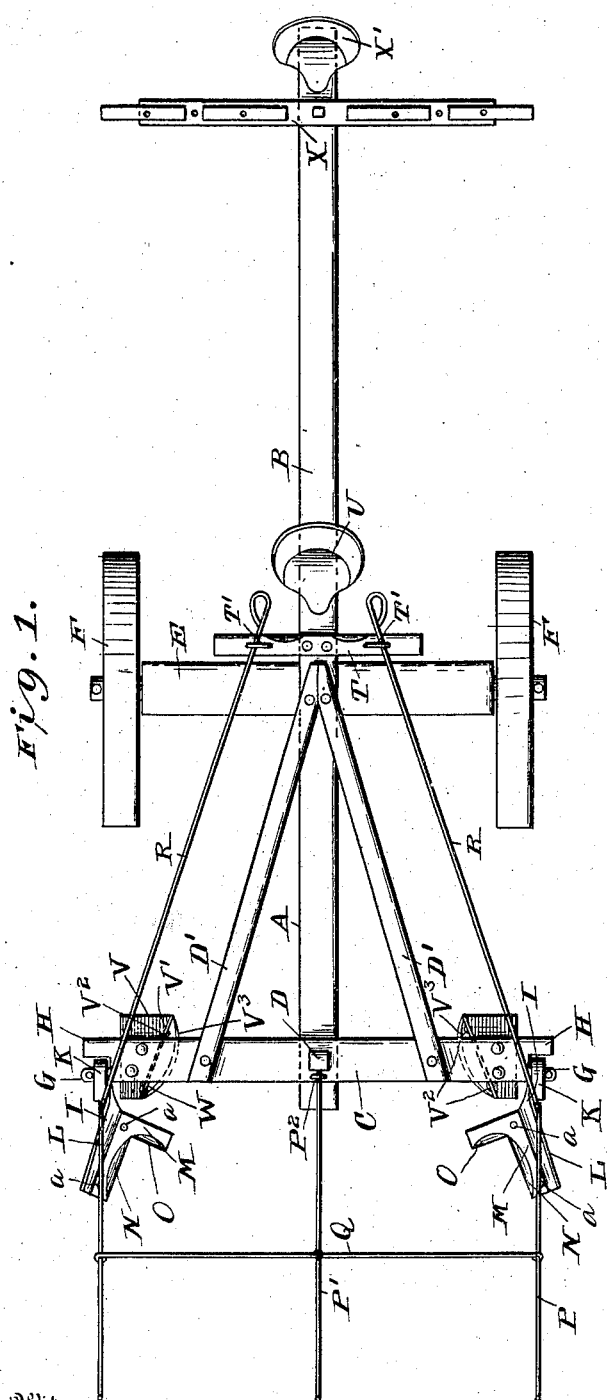
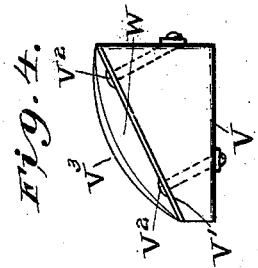
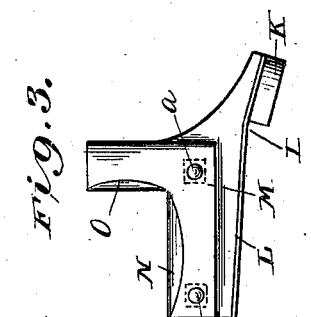
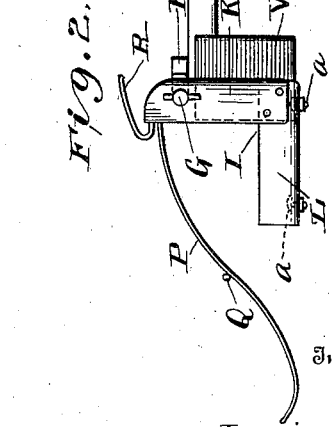
Witnesses
Jas. H. Blackwood
H. P. Doolittle
Inventor
Louis Decay
By Nathan Bickford
Attorney No. 741,314. Patented October 13, 1903.

UNITED STATES PATENT OFFICE.

LOUIS DECAY, OF LAPLACE, LOUISIANA.

SUGAR-CANE HARVESTER.

SPECIFICATION forming part of Letters Patent No. 741,314, dated October 13, 1903.

Application filed June 27, 1902. Serial No. 113,469. (No model.)

*To all whom it may concern:*

Be it known that I, LOUIS DECAY, a citizen of the United States, residing at Laplace, in the parish of St. John the Baptist and State of Louisiana, have invented certain new and useful Improvements in Sugar-Cane Harvesters; and I do declare the following to be a full, clear, and exact description of the invention, such as will enable others skilled in the art to which it appertains to make and use the same.

My invention relates to improvements in sugar-cane harvesters, and has for its object to provide a harvester for cutting sugar-cane standing in the field, which is simple and inexpensive in construction and very easy and effective in operation and to provide means by which the knives or cutting-blades act on the sugar-cane with a drawing or inclined action, which tends to prevent the cane from being pulled out at the roots.

It also has for its object to present the sugar-cane obliquely to the knives, throwing the cane toward the center of the harvester and picking up any sugar-cane which has been blown down and presenting the same to the cutting-knives.

My invention consists in the several features and combinations of features, as more fully hereinafter described and specifically claimed.

Referring to the drawings, Figure 1 is a top plan view of a harvester constructed in accordance with my invention; Fig. 2, a side view in elevation of a portion of the front of the harvester; Fig. 3, a detail view of one of the pivoted knives; Fig. 4, a detail view of one of the stationary knives.

In the drawings, in which like letters of reference denote like parts throughout the several views, A represents the frame of the harvester, which comprises a longitudinal beam B, a cross-beam C, secured by a bolt D or otherwise to the front end of the beam B, and D' are two braces, one end of each secured to the beam C and their opposite ends to the beam B. The harvester is supported on an axle E, secured to the beam B, on which are journaled two wheels F. The ends of the cross-beam C are provided with laterally-projecting lugs G and stops H. A knife I is pivotally mounted on each of said lugs, said knife having a vertically-extending shank K, a forwardly-extending wall L, a cutting-blade M in close proximity to the ground provided with a longitudinal cutting edge N and a laterally-extending cutting edge O, said edges being preferably at right angles to each other. The cutting-blade M is made detachable, so that in case it becomes broken it can be taken off by removing the bolts $a$ and a new blade substituted therefor. Projecting forwardly from the tops of each of the shanks K are curved fingers P, while a similar finger P' is hinged at $P^2$ about midway of the length of beam C. A cross-rod Q connects said fingers together and also serves to bend the sugar-cane downward, and thereby present it at an oblique angle to the knives.

The elevation of the fingers P P', which are designed to run under and pick up any sugar-cane which has been blown down or listed, and the elevation of the knives I is effected by means of rods R, attached to the shanks K, said rods being operated and held in the position desired by hand. The stops H are for the purpose of providing a bearing-surface for the rear of the shanks K, and thus prevent the knives I from being swung back too far.

T is a bar or foot-rest provided with guide-loops T', in which the rods slide.

U is a seat attached to the beam B for the use of the person who is to operate the rods R.

To the lower surface of the bar C, at a point just inside each of the shanks K, are secured blocks V, the inner surfaces V' of which converge or slant toward each other for the purpose of directing the sugar-cane after it has been cut by the knives toward the center of the harvester, and thereby prevent it from being run over by the wheels or trampled by the horses or mules, and also for the purpose of cutting the sugar-cane in the event that it should fail to be cut by the blades M.

W represents stationary knives fixed to the inner surfaces of V' of the blocks V by bolts $V^2$ or otherwise, having rounded cutting edges $V^3$, preferably in the same horizontal plane as the blades M.

X represents the doubletrees, and X' is the driver's seat.

It is designed to do the work with this harvester with two men and four horses or mules and hitch the horses or mules at the rear of the harvester instead of at the front.

In use the harvester is drawn through the field, the fingers $p\ p'$ picking up any sugar-cane that has been blown down, and the cross-rod Q coming in contact with the standing sugar-cane bends it down, so that it is presented to the pivoted knives at an oblique angle, and after being cut passes to the knives W, where it is given a finishing cutting in the event of the failure of the blades M to cut it, and then the inclined faces V' of the blocks V direct the sugar-cane toward the center of the harvester.

I do not wish to be limited to the precise construction as herein shown and described, as the same may be changed somewhat without departing from the spirit of my invention.

Having thus described my invention, what I claim is—

1. A sugar-cane harvester provided with knives having vertical shanks which are mounted on horizontal pivots, said shanks provided with curved fingers, and means for swinging said shanks on their pivots longitudinally of the harvester, substantially as described.

2. A sugar-cane harvester provided with pivoted knives having shanks, curved fingers projecting from said shanks, and a cross-bar connecting said fingers, substantially as described.

3. A sugar-cane harvester provided with pivoted knives at the front, stationary knives at the rear of said pivoted knives, and means for swinging said pivoted knives longitudinally of the harvester, substantially as described.

4. A sugar-cane harvester provided with a frame, a cross-beam thereon having a laterally-projecting lug at each end, knives having vertical shanks pivotally mounted on said lugs, and means for swinging said knives, substantially as described.

5. A sugar-cane harvester provided with a cross-beam having laterally-projecting lugs and stops at its opposite ends, knives pivotally mounted on said lugs, and means for swinging said knives on their pivots, substantially as described.

6. A sugar-cane harvester provided with a cross-beam having lugs and stops at its opposite ends, knives having vertical shanks which are pivotally mounted on said lugs, means for swinging said knives, and blocks attached to said cross-beam provided with stationary knives substantially as described.

7. A sugar-cane harvester provided with knives each having a vertically-extending side wall, and two angularly-disposed cutting edges substantially as described.

8. A sugar-cane harvester provided with pivoted knives, a foot-rest having loops, and rods attached to said knives, said rods passing through said loops and designed to slide therein, substantially as described.

9. A sugar-cane harvester provided with a cross-beam having lugs and stops at its opposite ends, knives pivotally mounted on said lugs, stationary knives attached to said cross-beam, a bar having loops, and rods attached to said pivoted knives passing through said loops, and fingers for picking up listed sugar-cane attached to the cross-beam and knives, substantially as described.

10. A sugar-cane harvester provided with pivoted knives having shanks, and means for picking up listed cane comprising a curved finger attached to each of said shanks, a cross-beam, a curved finger hinged to said cross-beam thereof, and a cross-rod connecting said fingers, substantially as described.

In testimony whereof I affix my signature in presence of two witnesses.

LOUIS DECAY.

Witnesses:
G. A. KETINE,
EMILE LAURENT.